United States Patent [19]

Duden

[11] 4,063,101

[45] Dec. 13, 1977

[54] PACKAGE FOR FILMS

[75] Inventor: Emanuel Hubert Duden, Mortsel, Belgium

[73] Assignee: AGFA-GEVAERT N.V., Mortsel, Belgium

[21] Appl. No.: 612,544

[22] Filed: Sept. 11, 1975

Related U.S. Application Data

[63] Continuation of Ser. No. 464,501, April 26, 1974, abandoned.

[30] Foreign Application Priority Data

Apr. 27, 1973 United Kingdom ............... 20183/73

[51] Int. Cl.[2] ........................ G03B 41/16; G03C 5/16

[52] U.S. Cl. .................................................... 250/475

[58] Field of Search ............. 250/475, 482, 321, 358 P

[56] References Cited

U.S. PATENT DOCUMENTS

| | | | |
|---|---|---|---|
| 2,412,174 | 12/1946 | Rhodes | 250/321 |
| 2,762,929 | 9/1956 | Muto et al. | 250/482 |
| 3,348,042 | 10/1967 | Umberg et al. | 250/475 |
| 3,458,033 | 7/1969 | Ariyasu et al. | 250/475 |

*Primary Examiner*—Alfred E. Smith
*Assistant Examiner*—B. C. Anderson
*Attorney, Agent, or Firm*—William J. Daniel

[57] ABSTRACT

A package intended for packaging industrial X-ray film in strip form is provided. It is particularly intended for X-ray examination of pipe-welds on the spot whereby the packaged film material is placed in a screw-like configuration around the weld to be inspected. The package permits edge-to-edge positioning of the film material.

5 Claims, 5 Drawing Figures

Figure 5:
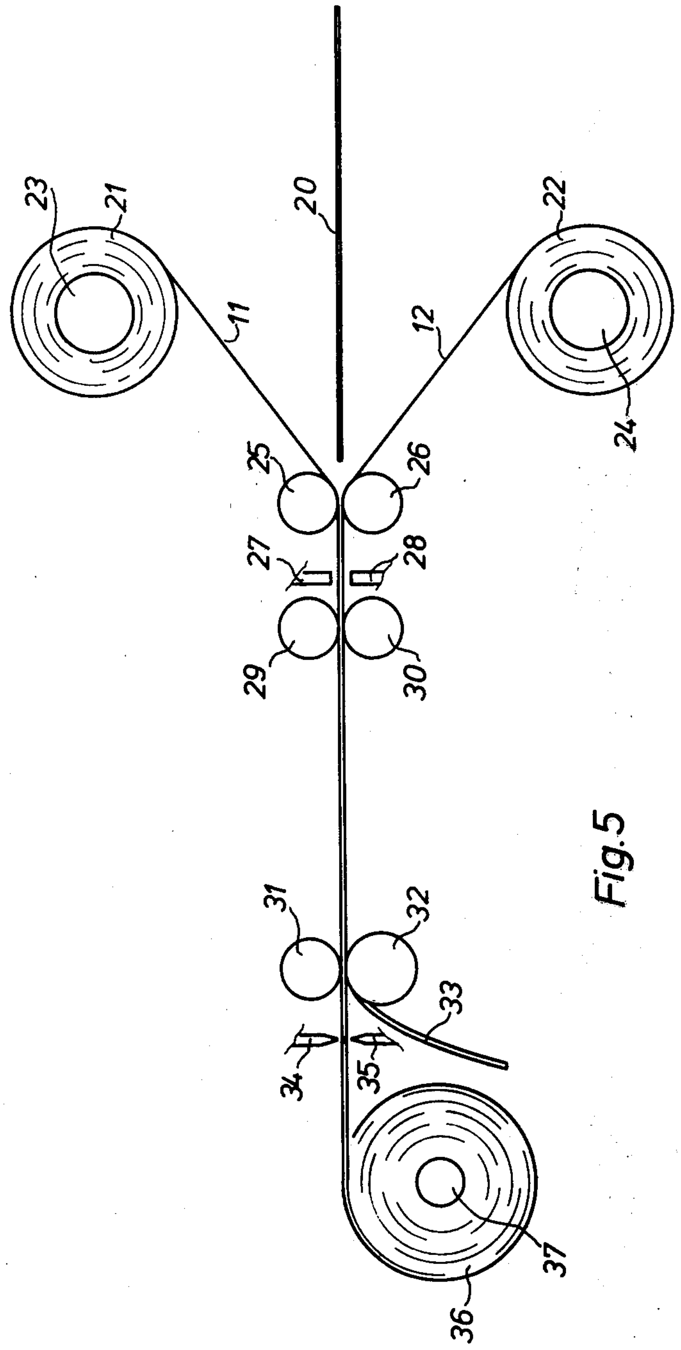

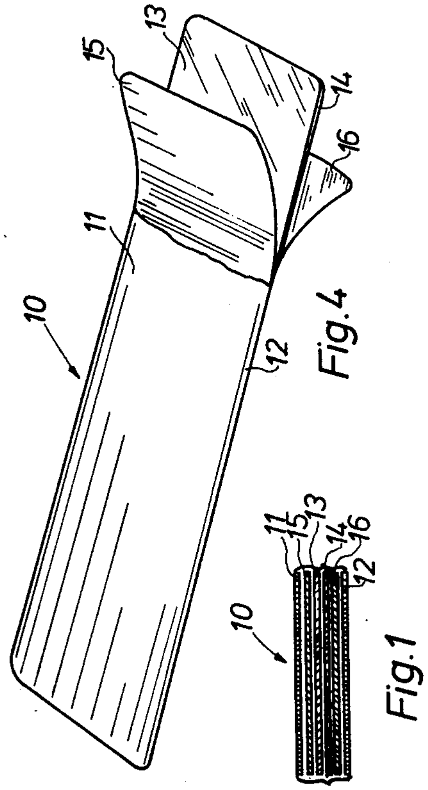
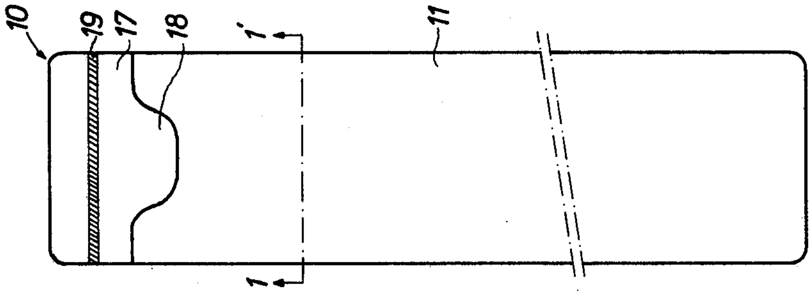
Fig.3
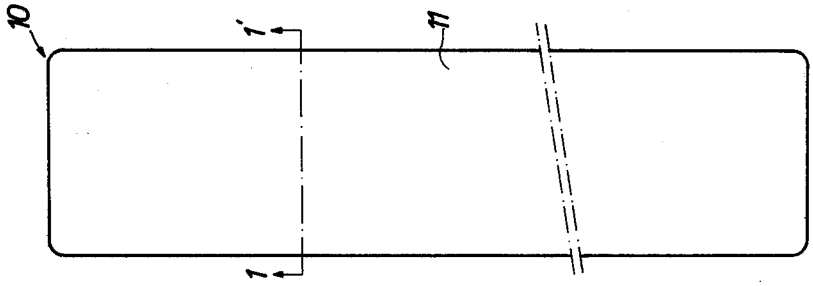
Fig.2

PACKAGE FOR FILMS

This is a continuation of Ser. No. 464,501, filed Apr. 26, 1974.

This invention relates to a method of making packages containing material in strip form enclosed in a packaging sleeve and to packages of that kind.

This invention is particularly but not exclusively concerned with film packages. More particularly, it is concerned with radiographic film packages containing radiographic film intended to be irradiated while in the package. To this class of materials belong amongst others dental X-ray films, some kinds of medical X-ray films, films used for personal monitoring purposes and the so-called industrial X-ray films which are used in the field of non-destructive testing technology.

In the following, only the last mentioned type of films will be further referred to but the packaging method and the package which are the objects of this invention may be used for every kind of film mentioned hereinbefore.

The invention reveals itself particularly well suited for making packages in roll form containing materials destined for use in the on site X-ray examination of pipe-welds. The prior art packages which were used until now for that purpose were built-up in such a way that the film and its optionally provided lead screens were enclosed over their entire length in a light proof, moisture- and grease resistant sleeve which consisted of a first web, having the same width as that of the film to be packed and a second web having a greater width, said second web being folded down at the edges of the first web and glued over the margins of such first web. The roll of packaged film may have a length of several meters. A length of the packaged film corresponding with the circumference of a tube to be inspected or with a plurality thereof is cut off from the roll and laid around the tube at the area where a weld to be inspected is present. Unfortunately, when tubes of very small diameter were to be radiographed, it could happen that the webs constituting the sleeve got detached due to the fact that the hardened glue no longer guaranteed secure joints between the webs. As a consequence, the sleeve got wrinkled and even opened at given places so that the light-tightness and the resistivity to moisture were no longer assured.

Another type of package consists of a sleeve in opaque high polymer material in seamless tube form in which the film is slid. Such packages have sufficient flexibility for wrapping around the circumference of a tube of small diameter. However accurate edge-to-edge positioning of successive convolutions or of neighbouring pieces of the packaged film is very difficult, if not impossible.

"Edge-to-edge" positioning is a must when not only a pipe-weld itself, but also parts in the immediate vicinity of the weld have to be inspected, for example when one wishes to detect any small cracks which may be present in a pipe-line due to internal stress which might be created as a consequence of the hot welding, the subsequent cooling and the placing of the pipe-line in a ditch. In that case a length of packaged film is normally wound around the pipe a number of times in a screw-line configuration and the area covered by the film wrappings is radiographed. For such a procedure it is necessary that the edge of a first winding is as close as possible to the edge of the following one, etc. in order to avoid that small areas should be excluded from inspection.

The possible play between the high polymer sleeve and the film contained in it makes it impossible to get a close and reproducible positioning of the one edge relative to the other.

The need for a high quality package thus remains.

It is an object of the invention to provide a package which does not show the mentioned drawbacks. Another object is to provide a method for packaging film and optional auxiliary materials in a light-tight and moisture proof sleeve showing supplementary advantages.

According to the invention, there is provided a package comprising material in strip form (particularly but not exclusively radiographic film) enclosed in a packaging envelope formed by two webs of thermoplastic material which have been sealed together along their longitudinal margins along lines substantially coincident with the edges of the enclosed strip, and along transverse lines at or near the opposite ends of such strip.

The invention includes a method of continuously packaging material in elongated strip form, such method comprising the steps of feeding the said strip of material and a pair of webs of thermoplastic material having a width greater than that of said strip of material, through a packaging station, parallel with the longitudinal axes of the said webs and strip, and so that the said strip becomes sandwiched between the two webs, and continuously sealing the margins of said webs together by means of radiant energy to form longitudinal seals at positions substantially coincident with the edges of said strip of material thereby to form a packaging sleeve in which such strip of material is held substantially without play, said webs being also sealed together transversely by means of radiant energy at positions in front of the leading edge and behind the trailing edge of said strip of material. Preferably, any surplus thermoplastics material lying to the outside of the longitudinal seams is continuously cut off as the webs pass through the packaging station or from the said station to a take up zone where the package is rolled up.

The invention also includes a method for continuously applying a close-fitting sleeve of thermoplastic material around a material in elongate strip form, comprising the steps of:

introducing said strip material between a first and a second web of said thermoplastic material in longitudinal direction of said webs, applying a first transverse high frequency sealing to said first and second web of thermoplastic material at the position of the leading edge of said strip material, continuously high frequency sealing both webs in longitudinal direction at the position of the side edges of said material in elongate strip form while cutting the side edges of the webs at the position of the side edges of said strip material, and applying a second transverse high frequency sealing of both webs at position of the trailing edge of said strip material.

The scope and spirit of the invention will be exemplified in the light of a description of a preferred embodiment with reference to the following figures in which:

FIG. 1 is a transverse cross-sectional view of a package obtained by a method according to the invention, FIG. 2 shows a package obtained by a method according to the invention, FIG. 3 shows another package obtained by said method, FIG. 4 shows an opened package, and FIG. 5 shows a longitudinal view of an elementary apparatus capable of packaging materials in elongate strip form according to the method claimed by the invention.

A sectional view of a package 10 according to the invention is presented in FIG. 1. Such package generally consists of a sleeve, formed by high frequency sealing to each other of two thin webs or strips (hereafter called "strips") of high polymer materials 11 and 12 which shows enough flexibility and mechanical strength for withstanding the conditions in which the package will be used. Polyvinylchloride has revealed itself as being well suited for this purpose. The thickness of the strips preferably amounts to a few hundredths of a millimeter. Also polyethylene may be used advantageously, provided ultrasonic energy is then used for the sealing process.

Within said sleeve are contained the film 13 or films 13 and 14 and optional auxiliary materials 15 and 16 which may be strips of a lead and paper laminate. It is clear that the dimensions of the different parts constituting the package represented in FIG. 1 are illustrated in an exaggerated way for the sake of clarity and that all the constituents are in intimate contact with each other by the fact that the sleeve firmly holds the whole set together. Also the play between the contents of the package and the sleeve at the edges is zero so that no part is allowed to perform the slightest shifting within the sleeve. The thinness of the high polymer material ensures that, when placing two wrappings with one longitudinal edge against the other, the radiation-sensitive materials they enclose become positioned virtually in edge-to-edge relationship.

FIGS. 2 and 3 show a longitudinal view of a package according to the invention. Both packages are represented as being lengthwise reduced, as the length of one single package may attain several tens of meters. Whereas in FIG. 2 the most common version of a package is illustrated, FIG. 3 shows a more sophisticated version which presents supplementary advantages. As can be seen, at one side the package 10 comprises a member 17 which is provided with a lip 18 and which has preliminarily been sealed to the strip 11 over a transversally extending contact area 19. When applying a relatively high pressure during the heat-sealing of the member 17 to the strip 11, zones of less mechanical resistance are formed in the area of the sealing itself. As a consequence, upon pulling the lip 18, the member 17 may be torn off, but in the meantime the sealings between the strips 11 and 12 at their turn may get loosened at the area covered by the member 17.

In this way, the further opening of the package 10 is greatly facilitated, because the separation of the constituting strips 11 and 12 becomes very easy along the sealings. Zones of less mechanical resistance may be formed in other ways, for example by providing a partial incision or a row of perforations along the sealing lines.

In order to illustrate the disposition of the materials enclosed in a package, FIG. 4 shows an opened package in isometric view. As can be noticed, the films 13 and 14 and the lead-paper laminates 15 and 16 are firmly held by the sleeve and no relative shifting versus each other is possible. In the case of extremely great lengths, for example 90 meters, one single package is wound upon a core and, on the spot, the required length is cut from the roll by means of a pair of scissors. The firm contact between the constituents reduces fogging by ambient light to a negligible extent as the light is unable to "creep" in the opened package over too great a distance.

In FIG. 5 is shown an elementary apparatus capable of packaging films and optional auxiliary materials into a sleeve of high polymer material.

For simplicity's sake, the pack comprising the films 13, 14 and the auxiliary materials 15, 16 will be denoted by the numeral 20. The strips 11 and 12 which constitute the sleeve of the package are delivered in web form from rolls 21 and 22 respectively. Both rolls are wound upon cores 23 and 24, which are supported by axes journalled in the machine frame (not represented). Both webs then pass over inlet rollers 25 and 26, together with the pack 20. When the leading edge of the pack 20 reaches the electrode 27 and the counter electrode 28, after having been detected by suitable detecting means, such as a roller which urges against the pack but being capable of moving in upward direction or a high frequent radiation which may be screened-off by the lead foils contained in the pack (both devices not represented) a high frequency sealing is applied which joins the strips 11 and 12 transversally.

At the same time two pairs of roller-electrodes such as 29, 30, positioned at opposite sides of the strips 11 and 12, and placed in close proximity of the exit end of a guide (not represented), the latter serving to maintain an accurate positioning of the pack and the constituting strips, join the latter longitudinally along the edges of the pack in such a way that there is no play between the sleeve formed by the strips 11 and 12 and the pack 20. Preferably said roller-electrodes 29, 30 are mounted on a frame carried by a microscrew (not represented) in order to permit small corrections of the position of said roller electrodes. In the mean time, a pair of rotating knives 31 and 32 cut off the superfluous borders of the packs along their edges. The cut-off portion 33 is removed from the machine and is collected. When the trailing edge of the pack passes between the electrodes 27, 28, a second transverse high frequency sealing is applied, so that the pack 20 becomes hermetically contained in the sleeve. Occasionally, the shape of the electrodes 27, 28 may be designed in such a way that the transverse sealings corresponding with the trailing edge of a first pack and the leading edge of a following one occur simultaneously. The belt, formed by the packages may be wound upon a core 37, so that a reel is obtained. When very great lengths of film are to be contained in one sole package, each individual package is wound upon a core. In this case a knife 34 and a counterknife 35 are provided which perform a transverse cutting when the sealing corresponding with the trailing edge of the package passes under them. When a plurality of packages has to be wound onto one core, the mechanism, which actuates the knife 34 and the counter-knife 35 may be so adjusted that the transverse cuttings do not penetrate completely through the sealed portion but only through the uppermost strip 11 in order to facilitate tearing off one package when necessary.

We claim:

1. An elongated strip package for flat radiographic film in elongated strip form which is adapted to be wound around a tubular body in multiple abutting helical windings with the film strip portions in adjacent windings of said package in tight edge to edge alignment, said package comprising two elongated webs of thermoplastic material disposed in flat face to face contact with opposite surface of said radiographic film strip, said webs having their corresponding longitudinal side edges pinched tightly against the corresponding side edges of said radiographic film strip and being heat sealed to one another along a line directly proximate with each such side edge of said film strip with substantially zero clearance from said side edge, whereby said radiographic film is enveloped in an intimate, tight-fitting sleeve, preventing any displacement of said radiographic film, and said webs having their opposite ends transversely sealed together adjacent the end edges of said strip to hermetically seal the package.

2. A package according to claim 1, in which a pull flap is provided at the leading edge of said first web of thermoplastic material in order to facilitate the opening of the package.

3. A package according to claim 1, in which said thermoplastic material is polyvinylchloride.

4. A package according to claim 1, in which said thermoplastic material is polyethylene.

5. A package according to claim 1, in which said material in strip form comprises at least one radiographic film and paper-lead laminates at opposite sides of said radiographic film.

* * * * *

Disclaimer 4,063,101.—*Emanuel H. Duden,* Mortsel, Belgium. PACKAGE FOR FILMS. Patent dated Dec. 13, 1977. Disclaimer filed Apr. 9, 1982, by the assignee, *Agfa-Gevaert, N.V.*

Hereby enters this disclaimer to all claims of said patent.

[*Official Gazette June 15, 1982.*]